United States Patent [19]
Blomgren

[11] Patent Number: 5,127,070
[45] Date of Patent: Jun. 30, 1992

[54] OPTICAL FIBER DISTRIBUTION MODULE

[75] Inventor: Jack P. Blomgren, Red Wing, Minn.

[73] Assignee: Minnesota Mining and Manufacturing Company, Saint Paul, Minn.

[21] Appl. No.: 652,175

[22] Filed: Feb. 7, 1991

[51] Int. Cl.⁵ .......................... G02B 6/00; G02B 6/36
[52] U.S. Cl. ..................................................... 385/55
[58] Field of Search ....................... 350/96.20–96.22

[56] References Cited

U.S. PATENT DOCUMENTS

| | | | |
|---|---|---|---|
| 4,470,180 | 9/1984 | Blomgren | 24/563 |
| 4,729,619 | 3/1988 | Blomgren | 350/96.21 |
| 4,790,618 | 12/1988 | Abe | 350/96.15 |
| 4,824,196 | 4/1989 | Bylander | 350/96.20 |
| 4,836,635 | 6/1989 | De Amorim | 350/96.18 X |
| 4,848,870 | 7/1989 | Wisecarver et al. | 350/96.21 |
| 4,865,412 | 9/1989 | Patterson | 350/96.22 X |
| 4,944,568 | 7/1990 | Danbach et al. | 350/96.15 X |

FOREIGN PATENT DOCUMENTS

0341027A2  11/1989  European Pat. Off.

OTHER PUBLICATIONS

Product literature from Siecor Corp., Hickory, NC regarding "Siecor's Universal Transport System".

Magazine Article regarding Reliable Electric's design for COFO series of fiberoptic enclosures for use in central office or large lan.

Product literature from AMP, Harrisburg, Pa. regarding "Optimate Single-Mode Fiber Optic Interconnection System".

*Primary Examiner*—Akm E. Ullah
*Attorney, Agent, or Firm*—Gary L. Griswold; Walter N. Kirn; Stephen W. Buckingham

[57] ABSTRACT

An optical fiber distribution module has a panel formed with a plurality of parallel lands having undercuts for releasably attaching a plurality of optical fiber connectors, each of which forms a bridge across the panel. The lands have sufficient length to permit two of the connectors to be attached to the same lands with a jacketed optical fiber from each of said connectors passing beneath the bridge defined by the other connector. When a large number of the connectors are attached to the panel, the passage of some optical fibers beneath such bridges helps to organize, route, and identify the interconnected optical fibers.

17 Claims, 3 Drawing Sheets

OPTICAL FIBER DISTRIBUTION MODULE

CROSS-REFERENCE TO RELATED APPLICATION

A coassigned patent application Ser. No. 07/561,734, filed Feb. 7, 1991, now U.S. Pat. No. 5,078,467 discloses a preferred optical fiber connector for use in the optical fiber distribution module of the invention. Its disclosure is incorporated herein by reference.

BACKGROUND OF THE INVENTION

1. Field of the Invention

The invention concerns an optical fiber distribution module including a panel on which a plurality of optical fiber connectors are releasably mounted in an orderly manner.

2. Description of the Related Art

A number of commercially available patch panels or modules contain a plurality of optical fiber connectors in a one or two rows. See the 24-fiber optical patch panel CPC of Siecor Corp., Hickory, N.C.: the COFO fiber optic enclosures of Reliable Electric, Franklin Par, Ill., that have slide-out shelves; and the distribution centers illustrated in Catalog 86-792 dated May 1987 and entitled "Opticmate Single-Mode Fiber Optic Interconnection System" from AMP., Harrisburg, Pa. pages 22 and 23. The latter refers to such modules as "connector organizer trays". See also: U.S. Pat No. 4,848,870 and EPO Patent Application EP 341,027A published Nov. 8, 1989.

In coassigned U.S. Pat. No. 4,824,196 (Bylander), optical fiber connectors are mounted in a single row along one edge of each of a plurality of modules, each of which can be pivoted out of a housing to afford access to the connectors, and then returned to the protection of the housing. Each connector is mounted at an angle such that it can be reached with minimal impediment from optical fibers of adjacent connectors.

A relatively inexpensive mechanical optical fiber connector can be constructed as disclosed in coassigned U.S. Pat. No. 4,470,180 (Blomgren). A preferred connector of the Blomgren '180 patent includes an elongated mount that is encompassed by a resiliently deformable housing which, in its relatively undeformed state, can urge a free end of an optical fiber against a straight longitudinal groove in the surface of the mount. Upon squeezing to deform the housing, a free end of a second optical fiber can be removed or inserted to become coaxially interconnected with the first as shown in FIG. 6C of the Blomgren '180 patent.

In an improvement of the connector of the Blomgren '180 patent, the elongated mount is a mandrel of substantially uniformly elliptical cross section as disclosed in coassigned U.S. Pat. No. 4,729,619 (Blomgren). An optical fiber connector now on the market ("DORRAN" #07-00060 from 3M) is constructed as taught in both Blomgren patents and also, as in the Blomgren '619 patent, has a strain-relief chock formed with a trough against which the fiber buffer layer can be gripped after being exposed by stripping.

THE DISCLOSURE OF THE ABOVE-CITED PATENT APPLICATION

Application Ser. No. 651,734 filed Feb. 2, 1991 now U.S. Pat. No. 5,078,467 discloses an optical fiber connector, which like the DORRAN connector, has a mount encompassed by a resiliently deformable housing. The connector of the application differs from the DORRAN connector in that its housing, or an envelope fitting around the housing, incorporates a pair of flanges that act as second-class levers when squeezed together by ones fingers to deform the housing to receive the free end of an optical fiber or to release it.

SUMMARY OF THE INVENTION

The invention provides an optical fiber distribution module for a plurality of optical fiber connectors, which module in comparison to those discussed above should be no more expensive to manufacture but more convenient to use. For example, it should be feasible to mount and organize, without confusing congestion, a significantly greater number of optical fiber connectors than has been possible with prior modules or patch panels of comparable size.

Briefly, the optical fiber distribution module of the invention comprises:

a panel, a surface of which is formed with a plurality of parallel lands and grooves and a plurality of optical fiber connectors, each of which is formed with a body, a pair of spaced flanges, and means for releasably attaching the spaced flanges to the lands.

Preferably, each connector can be attached at any position along the lands, with the body and flanges of each attached connector defining a bridge across the panel, and the lands and grooves have sufficient length to permit two of the connectors to be attached with a buffered optical fiber that is connected to either of said two connectors extending directly from the connector to pass beneath the bridge defined by the other of said two connectors. When a large number of the connectors are thus attached to the panel, the passage of optical fibers beneath such bridges can help to route, organize, and identify the fibers.

The term "optical fiber connectors" is here used to encompass 1) disconnectable mechanical connectors,
2) connectors that cannot be disconnected and generally are called "splices",
3) switches that can interconnect one or more optical fibers with one or more additional optical fibers, and
4) implements for connecting optical fibers to optoelectronic devices.

The connectors can conveniently be color coded, as can auxiliary bridging devices, to assist in identifying each of the optical fibers.

While being useful with all such connectors, the novel distribution module is particularly useful with mechanical connectors, especially the connector of the above-cited Application 46672USA7A which has a deformable housing, or an envelope around the housing, that incorporates a pair of flanges, the extremities of which can be formed to interlock with lands of a panel. In making a connection between a connector and lands, the flanges preferably are biased away from each other to make a more secure attachment. This results in a force that causes the housing to press more tightly against a captured element such as an optical fiber, thus better ensuring that the fiber stays in place.

THE DRAWING

The invention may be more easily understood in reference to the drawing, each figure of which is schematic. In the drawing.

DETAILED DESCRIPTION OF A PREFERRED EMBODIMENT

Figure 1:
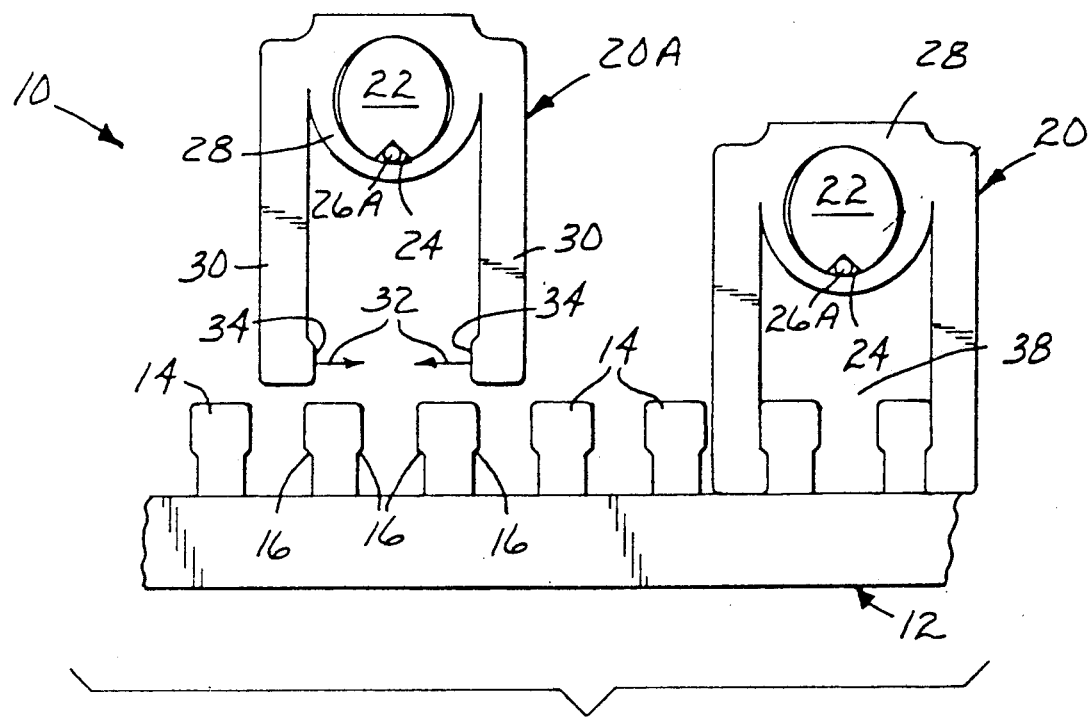
FIG. 1 is an end view of a first optical fiber distribution module of the invention including two of the mechanical connectors of the above-cited patent application.

The optical fiber distribution module 10 of FIG. 1 has a panel 12 formed with a plurality of lands 14, the sides of which have undercuts 16. One mechanical optical fiber connector 20 is mechanically attached to the panel, and an identical connector 20A is in position to be attached. Each has an elongated mount 22 which is a mandrel of elliptical cross section. The surface of the mandrel is formed with a longitudinal V-groove 24 of uniform depth in which is seated the bare end 26A of an optical fiber 26. Encompassing the mandrel is a resiliently deformable housing 28 which when undeformed, grips the bare end of the fiber against the mount.

Integral with the housing are a pair of flanges 30 that normally extend parallel to each other and act as second-class levers. When squeezed in the direction of the arrows 32 by ones fingers, the flanges deform the housing to release the bare end of the fiber. The flanges are resilient and so flex outwardly to permit protrusions 34 at their extremities to mate with the undercuts 16. By being so flexed, the optical fiber 26 is gripped more tightly by the housing 28.

Figure 2:
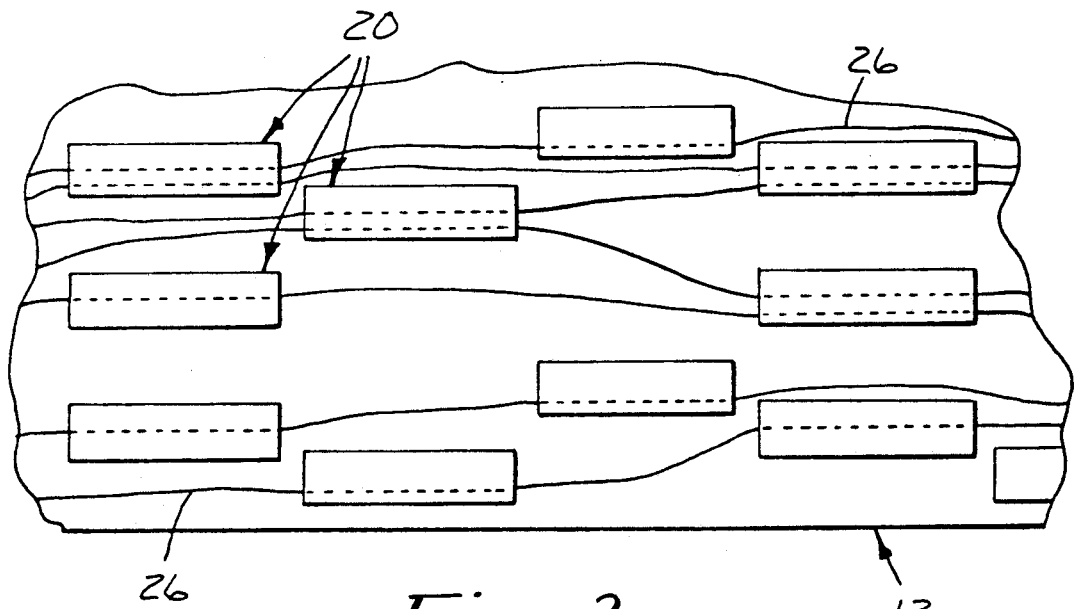
FIG. 2 is a top view of the optical fiber distribution module of FIG. 1 including a large number of the mechanical connectors.

When a plurality of the connectors 20 are attached to the panel 12, each housing 28 and its flanges 30 form a bridge to create a passage 38 through which one or more jacketed optical fibers 26 can pass as indicated in FIG. 2, thus helping to organize and route the optical fibers that extend from the connectors. In FIG. 2, the lands and grooves are not shown.

Figure 3:
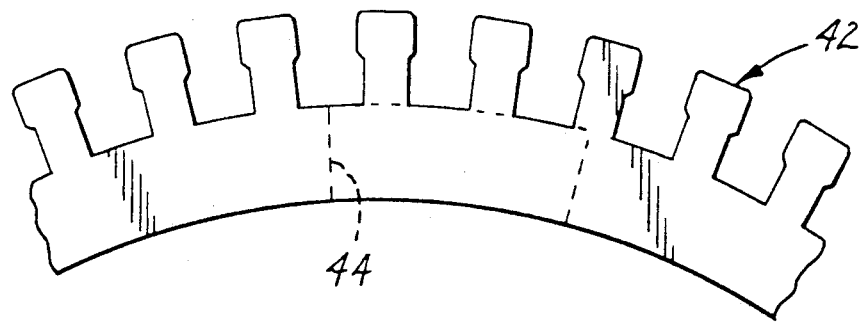
FIG. 3 is an end view of a portion of the panel of a second optical fiber distribution module of the invention.

Shown in FIG. 3 is a segment of a cylindrical panel 42 of a second optical fiber distribution module. The panel 42 can be used with the mechanical optical fiber connectors 20 of FIGS. 1 and 2. The panel is formed with one or more ducts 44 to permit optical fibers to be routed through the cylindrical interior, thus further organizing the fibers.

Figure 4:
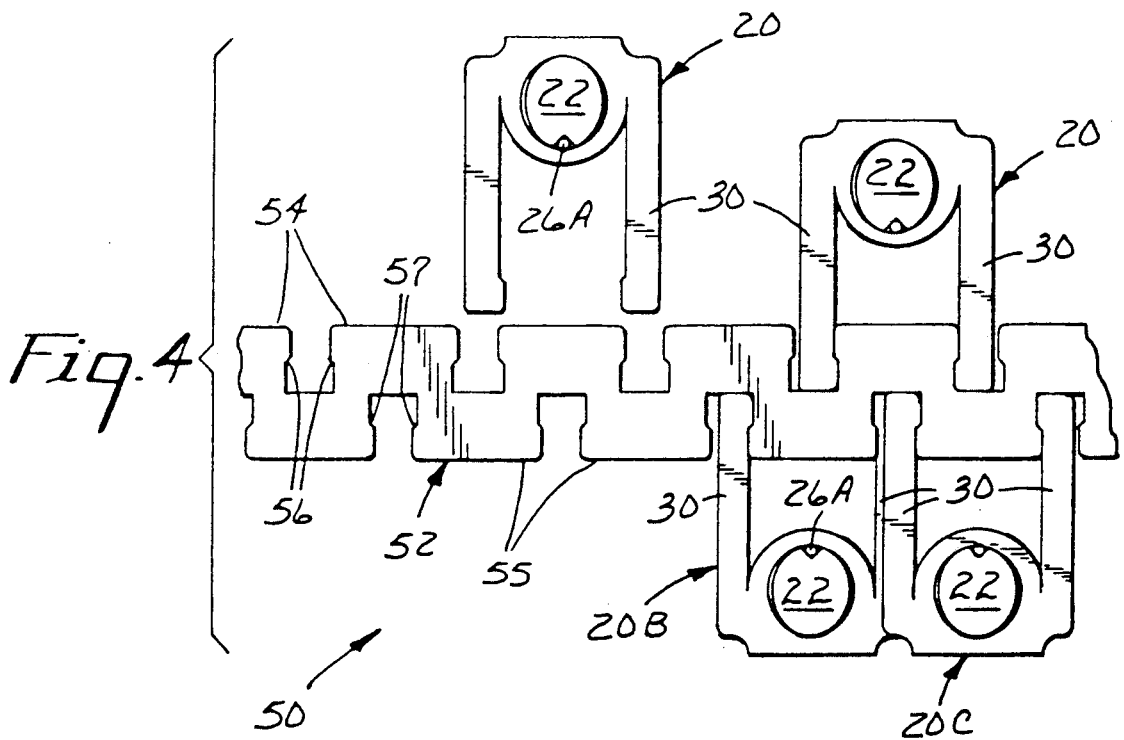
FIG. 4 is an end view of a third optical fiber distribution module of the invention including four of the mechanical connectors of the above-cited patent application.

The optical fiber distribution module 50 of FIG. 4 has a panel 52, each side of which is formed with a plurality of lands 54 and 55 having undercuts 56 and 57, respectively. One mechanical optical fiber connector 20B is positioned behind another connector 20C, and one flange 30 of each connector fits into the same channel between adjacent lands 55.

Figure 5:
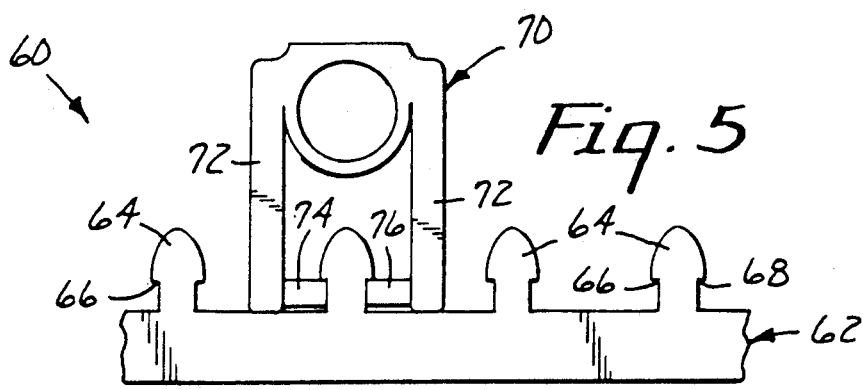
FIG. 5 is an end view of a fourth optical fiber distribution module of the invention including one mechanical connector of the above-cited patent application.

The optical fiber distribution module 60 of FIG. 5 has a panel 62 formed with a plurality of lands 64, each of which has undercuts 66 and 68 on its sides. A mechanical optical fiber connector 70 has a pair of flanges 72 that act as second-class levers. The extremities of the flanges are formed with protrusions 74 and 76 that mate with the undercuts 66 and 68, respectively.

Figure 6:
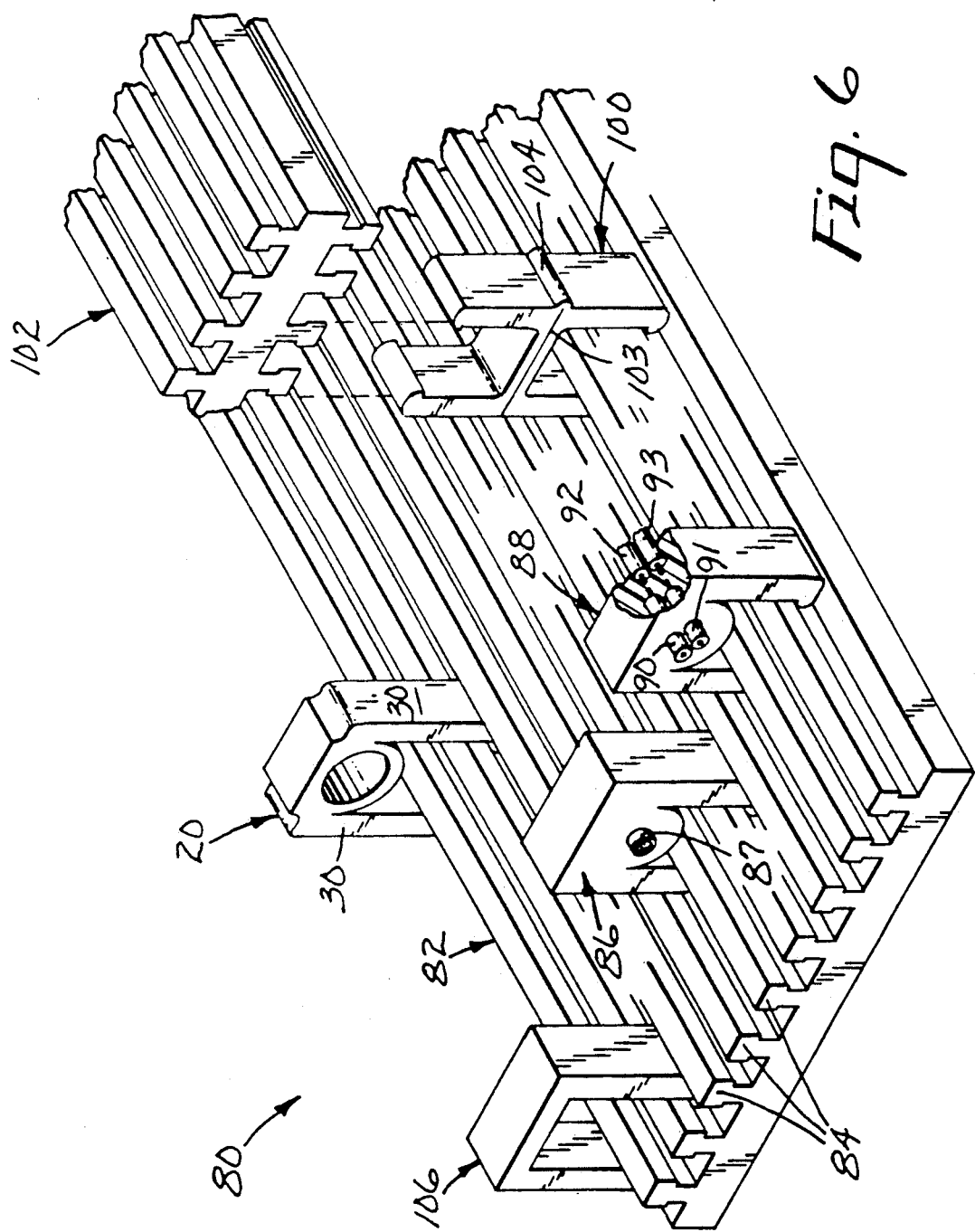
FIG. 6 is an isometric view of a fifth optical fiber distribution module of the invention including various optical fiber connectors.

The optical fiber distribution module 80 of FIG. 6 has a panel 82 formed with a plurality of lands 84, each having undercuts on each side. Releasably mounted on the panel 82 are several optical fiber connectors, each of which has a body, a pair of spaced flanges, and means for releasably attaching the spaced flanges to the lands at any position along the lands. One of those is an optical fiber connector 20 of FIG. 1. A second is an implement 86 for connecting an optical fiber (not shown) to an opto-electronic element 87. A third is a switch 88 that can interconnect (by means not shown) either of two optical fibers 90 and 91 to either of two other optical fibers 92 and 93.

Also releasably attached to the panel 82 of FIG. 6 is a standoff 100 that has two sets of flanges so that it and other standoffs (not shown) can mount a second panel 102 above the first. The central web of the standoff 100 is cut through at 103 to a living hinge 104, thus permitting the second panel 102 to be pivoted to one side for convenient access to the optical fiber connectors positioned on the first. Each of the standoff 100 and a U-shaped member 106 is an auxiliary bridge-forming device that can cooperate with the connectors 20, 86 and 88 to organize, route, and identify optical fibers emanating from the connectors.

EXAMPLE

A prototype of the optical fiber distribution module 10 of FIG. 1 has been made by machining from blocks of polyetherimide resin ("ULTEM" 11000 from GE) both the panel 12 and a number of mechanical optical fiber connectors 20 that differ from each other as follows. One has a continuous flange on each side, hence two levers; one flange of a second connector is divided centrally to form two levers; both flanges of a third connector are divided centrally to form two levers on each side. Each of the connectors 20 and the panel have the following dimensions:

| envelope of the connectors | |
|---|---|
| length | 32 mm |
| height | 10 mm |
| width | 7 mm |
| flange thickness | 1.4 mm |
| panel | |
| max. width of lands | 1.37 mm |
| angles of undercuts | 45° |
| radius of rounds at top of lands | 0.38 mm |
| width of lands beneath undercuts | 1.22 mm |
| min. spacing between lands | f.60 mm |
| height of lands | 2.54 mm |
| height of lands above undercuts | 1.14 mm |

The lands and the flanges of each of the connectors were sufficiently resilient such that the connectors were easily attached to and detached from the lands of the panel and yet remained securely in place because of a slight spreading of the flanges during attachment. For this reason, the resins or other materials for the panel and connectors should be selected for minimal plastic flow.

What is claimed is:

1. An optical fiber distribution module comprising:
   a panel, a surface of which is formed with a plurality of parallel lands, a plurality of optical fiber connectors, each of which is formed with a body, a pair of spaced flanges, and means for releasably attaching the spaced flanges to the lands at any position along the lands so that the body and flanges of each attached connector define a bridge across the panel, and the lands having sufficient length to permit two of the connectors to be attached to the same land or lands with an optical fiber that is connected to either of said two connectors extending directly from that connector to pass beneath the bridge defined by the other of said two connectors.

2. An optical fiber distribution module as defined in claim 1 wherein said body of one of said connectors comprises an elongated mount encompassed by a resiliently deformable housing that, in its relatively undeformed state, can optically interconnect two optical fibers by urging their ends against a straight longitudinal groove in the surface of the mount.

3. An optical fiber distribution module as defined in claim 2 wherein said housing is surrounded by an envelope that is integral with said pair of flanges which are second-class levers that, when squeezed together by ones fingers, deform the housing to release said optical fibers.

4. An optical fiber distribution module as defined in claim 3 wherein the flanges normally extend substantially parallel to each other and contact the housing approximately at the diameter of the mount.

5. An optical fiber distribution module as defined in claim 4 wherein the envelope is a unitary molded piece of resilient resin that incorporates the housing.

6. An optical fiber distribution module as defined in claim 4 wherein the envelope is a unitary molded piece of resilient resin that fits over the housing.

7. An optical fiber distribution module as defined in claim 3 wherein said envelope incorporates means for restricting the movement of the flanges toward each other.

8. An optical fiber distribution module as defined in claim 7 wherein said movement restricting means comprises a protrusion integral with each of said flanges, which protrusions abut when the flanges are squeezed together.

9. An optical fiber distribution module as defined in claim 1 wherein each side of each of the lands is formed with an undercut, and the protrusion on each flange of a connector mates with one of the undercuts when the connector is attached to the panel.

10. An optical fiber distribution module as defined in claim 9 wherein each of the lands and flanges is resilient for ease of connection and disconnection.

11. An optical fiber distribution module as defined in claim 9 wherein said protrusions mate with undercuts on both sides of one land.

12. An optical fiber distribution module as defined in claim 9 wherein said protrusions mate with undercuts of different lands.

13. An optical fiber distribution module as defined in claim 1 wherein at least one of said connectors is a splice that cannot be disconnected.

14. An optical fiber distribution module as defined in claim 1 wherein at least one of said connectors is a switch that can interconnect one or more optical fibers with one or more additional optical fibers.

15. An optical fiber distribution module as defined in claim 1 wherein at least one of said connectors connects an optical fiber to an opto-electronic device.

16. An optical fiber distribution module comprising:
a panel, a surface of which is formed with a plurality of parallel lands,
a plurality of optical fiber connectors, each of which is formed with a body, a pair of spaced flanges, and means for releasably attaching the spaced flanges to the lands at any position along the lands so that the body and flanges of each attached connector define a bridge across the panel,
the lands having sufficient length to permit two of the connectors to be attached to the same land or lands,
each of at least some of said connectors comprising an elongated mount and means for gripping an end of an optical fiber against a straight longitudinal groove in the surface of the mount, and
a plurality of optical fibers, one end of each being gripped at one of said connectors and extending directly from that connector to pass beneath the bridge defined by another of said connectors.

17. An optical fiber distribution module as defined in claim 16 and further comprising at least one auxiliary bridge-forming device, and at least one optical fiber that is gripped at one of said connectors extends directly from that connector to pass beneath the bridge defined by said auxiliary bridge-forming device.

* * * * *